(12) United States Patent
Kain

(10) Patent No.: US 6,607,243 B2
(45) Date of Patent: Aug. 19, 2003

(54) SEAT SHELL FOR JUVENILE VEHICLE SEAT

(75) Inventor: James M. Kain, Troy, OH (US)

(73) Assignee: Cosco Management, Inc., Wilmington, DE (US)

( * ) Notice: Subject to any disclaimer, the term of this patent is extended or adjusted under 35 U.S.C. 154(b) by 32 days.

(21) Appl. No.: 09/815,750

(22) Filed: Mar. 23, 2001

(65) Prior Publication Data

US 2002/0135212 A1 Sep. 26, 2002

(51) Int. Cl.$^7$ ................................................. A47C 1/08
(52) U.S. Cl. .................... 297/250.1; 297/411.2
(58) Field of Search ........................... 297/250.1, 251, 297/440.1, 440.24, 440.14, 188.04, 229, 228.1, 411.2, DIG. 2, 411.46, 227, 411.25, 411.28, 411.29, 219.1, 219.12, 228

(56) References Cited

U.S. PATENT DOCUMENTS

| | | | | |
|---|---|---|---|---|
| 3,893,729 A | * | 7/1975 | Sherman et al. ............ 297/118 |
| 4,466,664 A | * | 8/1984 | Kondou ...................... 297/411 |
| 4,685,741 A | * | 8/1987 | Tsuge et al. ......... 297/250.1 X |
| 5,023,125 A | * | 6/1991 | Gray ................... 297/228.1 X |
| 5,332,292 A | * | 7/1994 | Price et al. ................. 297/488 |
| 5,395,161 A | * | 3/1995 | Spykerman et al. ..... 297/411.2 |
| D365,691 S | * | 1/1996 | Sedlack ....................... D6/331 |
| 5,549,355 A | * | 8/1996 | Illulian ................... 297/229 X |
| 5,897,162 A | * | 4/1999 | Humes et al. ....... 297/250.1 X |
| 6,106,057 A | * | 8/2000 | Lee ..................... 297/250.1 X |
| 6,283,551 B1 | * | 9/2001 | Bergin .................. 297/411.35 |
| 6,296,307 B1 | * | 10/2001 | Holtke ................ 297/250.1 X |
| 6,478,372 B1 | * | 11/2002 | Lemmeyer et al. .... 297/188.18 |

* cited by examiner

Primary Examiner—Peter M. Cuomo
Assistant Examiner—Stephen Vu
(74) Attorney, Agent, or Firm—Barnes & Thornburg

(57) ABSTRACT

A juvenile vehicle seat includes a seat shell and a pair of armrests cantilevered to sides of the seat shell. A seat pad includes a seat portion on the seat shell and sleeves receiving each armrest therein.

17 Claims, 3 Drawing Sheets

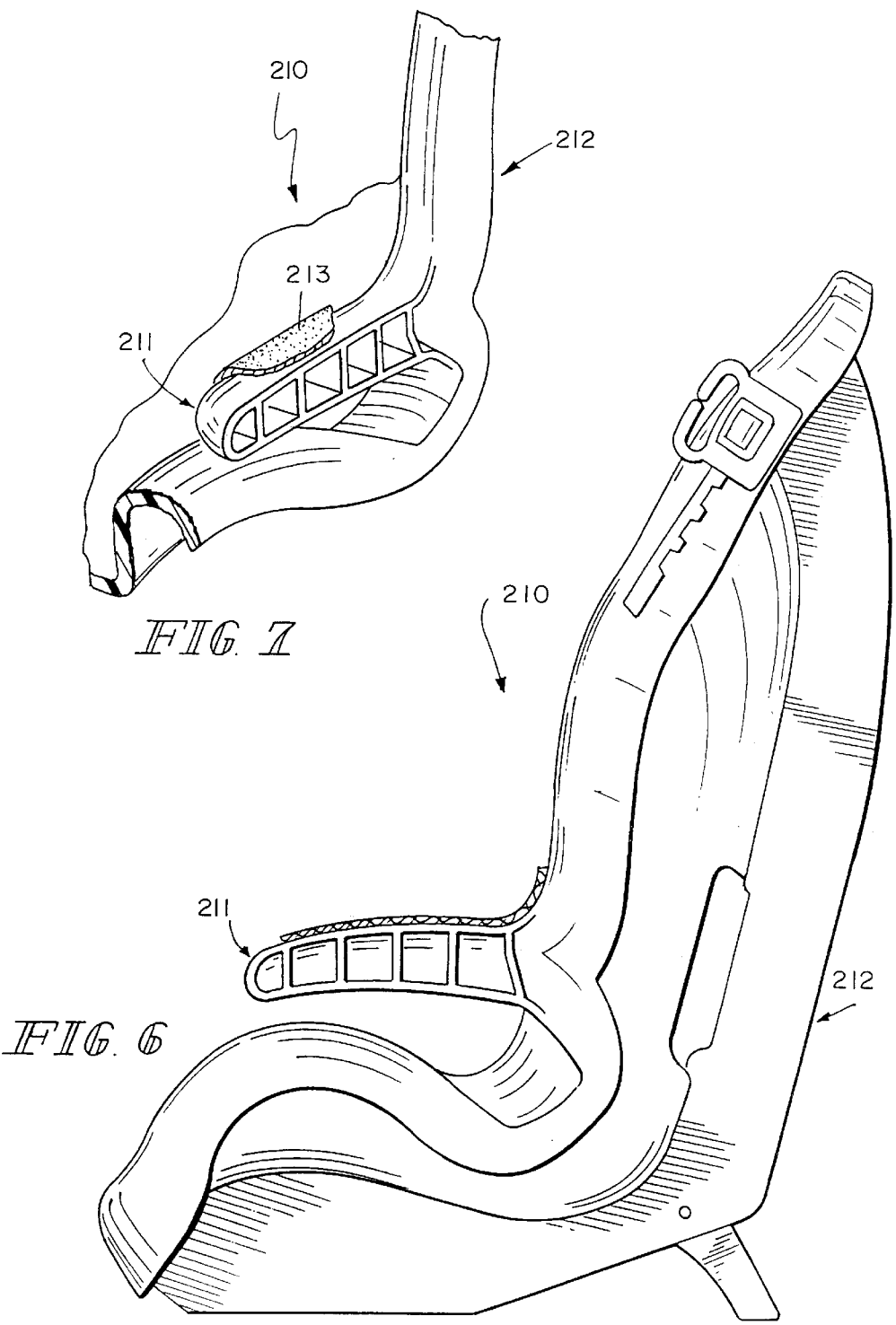

SEAT SHELL FOR JUVENILE VEHICLE SEAT

BACKGROUND AND SUMMARY OF THE INVENTION

The present invention relates to a juvenile vehicle seat, and particularly to a seat shell for a juvenile vehicle seat. More particularly, the present invention relates to a juvenile vehicle seat including armrests.

According to the present invention, a juvenile vehicle seat includes a seat shell and a pair of armrests cantilevered to sides of the seat shell. A seat pad includes a seat portion on the seat shell and sleeves receiving each armrest therein.

In preferred embodiments, the seat shell is made of a plastics material and each armrest is integral with and cantilevered to one side of a seat back included in the seat shell. Each armrest includes an inner side wall facing in a direction toward a seat bottom included in the seat shell and top and bottom walls coupled to the inner side wall to form an interior region containing a set of rigidifying ribs.

Each armrest is configured to include the inner side wall along an inner side of the armrest and an opening into the interior region along an outer side of the armrest. The sleeve included in the seat pad covers that opening to hide from view the rigidifying ribs located in the interior region of the armrest. In certain embodiments, a side cover is coupled to the armrest to close that opening and is located between the rigidifying ribs and an outer portion of the sleeve.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 6 is a side elevation view of a juvenile vehicle seat in accordance with another embodiment of the invention; and FIG. 7 is a perspective view of a portion of the seat shown in FIG. 6.

DETAILED DESCRIPTION OF THE DRAWINGS

Figure 1:
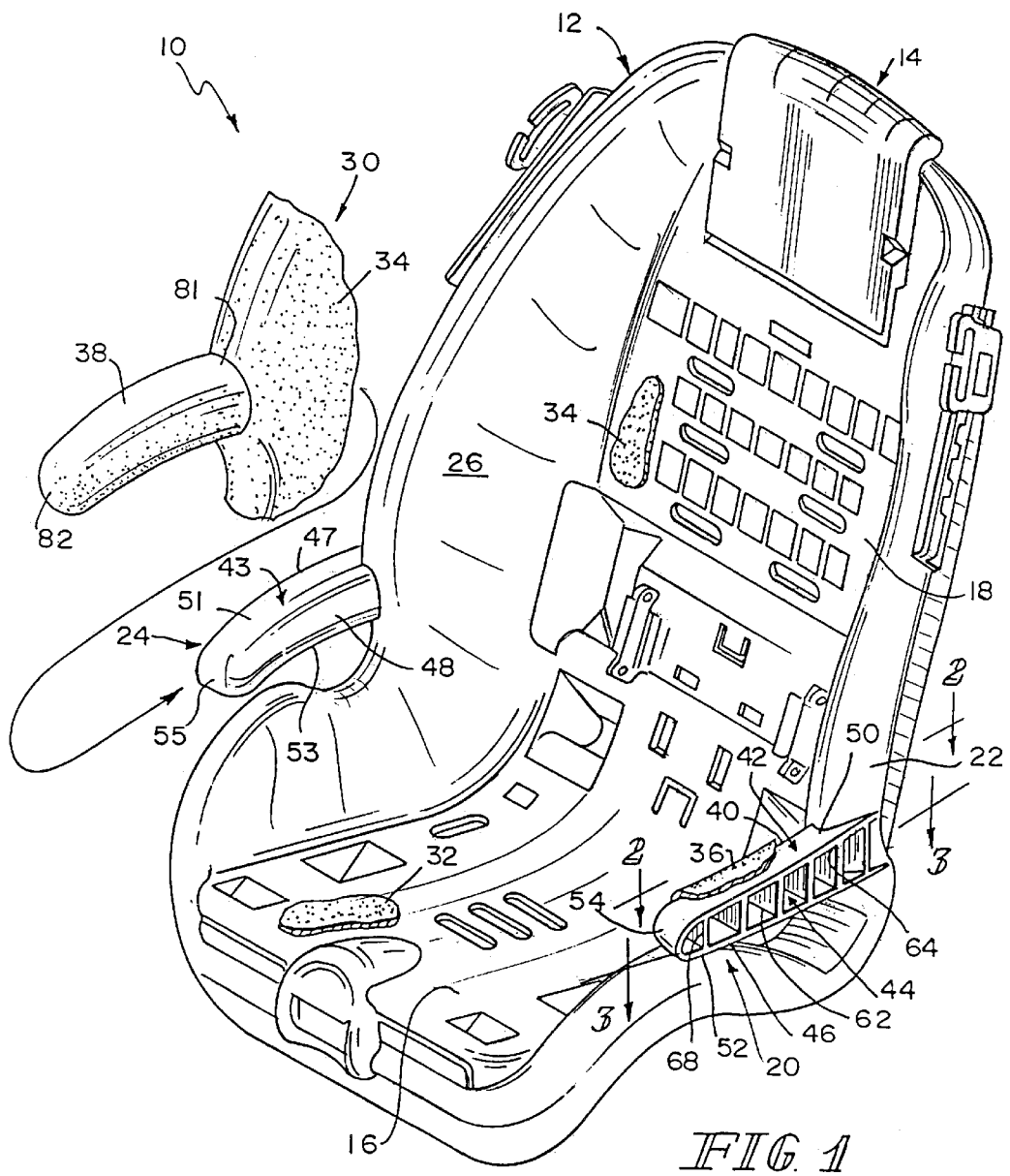
FIG. 1 shows a perspective view of a seat shell showing a portion of a seat shell cover configured to fit like a glove onto the fixed cantilevered "right-arm" armrest included in the seat shell and showing the "open" outer side wall of the fixed cantilevered "left-arm" armrest.

Juvenile vehicle seat 10 includes a seat shell 12 made of a plastics material and an adjustable headrest 14 movable relative to seat shell 12 as shown in FIG. 1. Seat shell 12 includes a seat bottom 16 and a seat back 18 extending upwardly relative to seat bottom 16. A left-arm armrest 20 is integral with and cantilevered to a left side 22 of seat back 18. A right-arm armrest 24 is integral with and cantilevered to a right side 26 of seat back 18.

Juvenile vehicle seat 10 also includes a seat pad 30 for providing a soft cover on seat shell 12. Portions of seat pad 30 are shown in FIG. 1. Seat pad 30 includes a bottom portion 32 on seat bottom 16, a back portion 34 on seat back 18, a left sleeve 36 coupled to back portion 34 and arranged to cover left-arm armrest 20, and a right sleeve 38 coupled to back portion 34 and arranged to cover right-arm armrest 24 as shown in FIG. 1.

Figure 2:
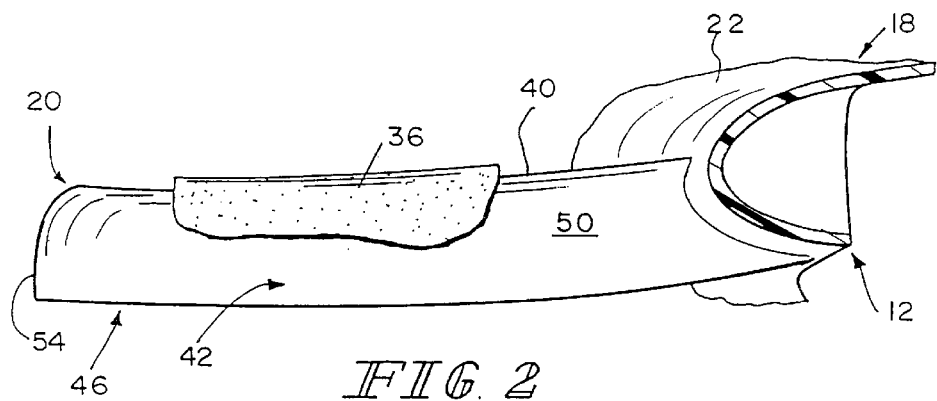
FIG. 2 is a top plan view of the left-arm armrest taken along line 2—2 of FIG. 1.
Figure 3:
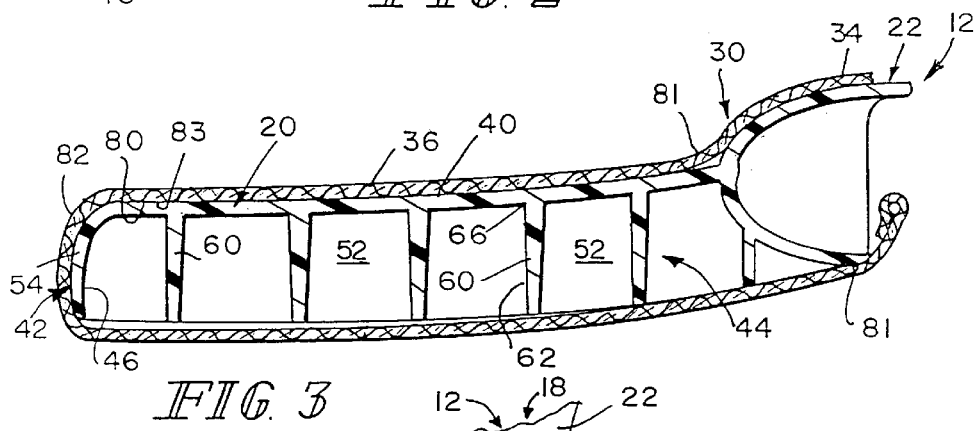
FIG. 3 is a sectional view of the left-arm armrest and cover taken along line 3—3 of FIG. 1 showing internal rigidifying ribs provided inside the armrest.
Figure 4:
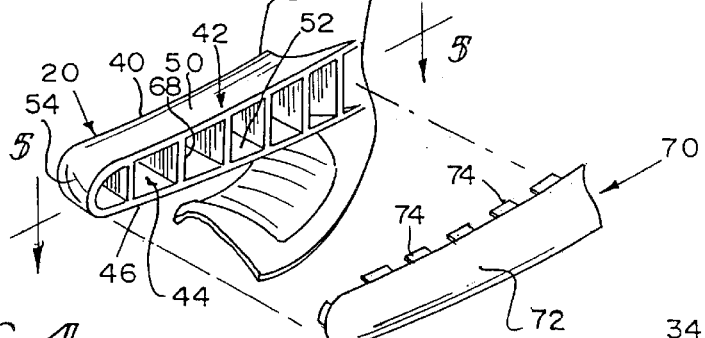
FIG. 4 is a perspective view of a portion of the seat shell of FIG. 1 showing a side cover provided with snap-fit connectors and adapted to be coupled to the left-arm armrest prior to slipping the left sleeve of the seat pad onto the left-arm armrest to close the exterior opening in the left-arm armrest.

As shown in FIGS. 1, 2, and 4, left-side armrest 20 includes an inner side wall 40 along one side of armrest 20 and a boundary wall 42 coupled to inner side wall 40 to define an interior region 44 having an opening 46 along another side of armrest 20. Right-side armrest 24 has a configuration similar to left-side armrest 20 and a boundary wall 43 defining an interior region housing an opening 47. Right-side armrest 24 is arranged to lie on an opposite side of seat bottom 16 from left-side armrest 20 so that the inner side wall 40 of left-side armrest 20 faces toward an inner side wall 48 of right-side armrest 24 and openings 46, 47 in each armrest 20, 24 face in opposite directions from seat bottom 16.

As shown in FIGS. 1 and 4, boundary wall 42 of left-side armrest 20 is U-shaped. Boundary wall 42 includes an elongated top wall 50 extending away from seat back 18 to lie generally parallel to seat bottom 16 and an elongated bottom wall 52 extending away from seat back 18 to lie under and in generally spaced-apart relation to top wall 50. Boundary wall 42 also includes a front wall 54 interconnecting top and bottom walls 50, 52 and lying in generally perpendicular relation thereto. Boundary wall 43 of right-side armrest 24 is similar to wall 42 and includes top wall 51, bottom wall 53, and front wall 55.

Each armrest 20, 24 includes several rigidifying ribs located in the interior region formed by the armrest walls. For example, left-side armrest 20 includes several ribs 60 as shown in FIGS. 1 and 3–5. Each rib 60 is defined by a wall having a bottom edge 62 coupled to bottom wall 52, a top edge 64 coupled to top wall 50, a first side edge 66 coupled to inner side wall 40, and a second side edge 68 positioned to lie in the opening 46 into the interior region 44 formed in armrest 20.

Figure 5:
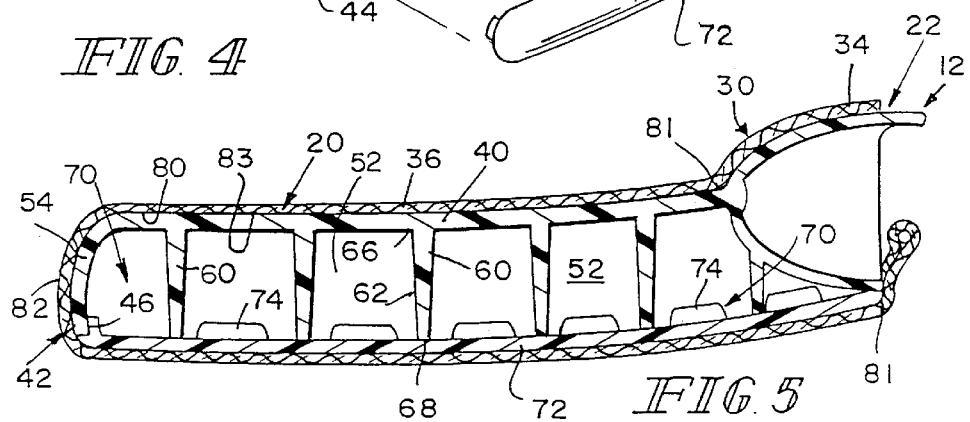
FIG. 5 is a sectional view taken along line 5—5 of FIG. 3.

In one embodiment, juvenile vehicle seat 10 also includes a pair of side covers for providing an outer side wall along the outer side of each armrest 20, 24, as shown, for example in FIGS. 4 and 5. A side cover 70 is configured to be coupled to left-side armrest 20 to cover the ribs 60 located in the interior region 44 formed in armrest 20. Side cover 70 includes a wall 72 and connectors 74 configured to engage armrest 20 to retain side cover 70 in a fixed position on armrest 20. Side cover 70 is arranged to close the opening 46 into interior region 44 and to cause wall 72 to engage or lie adjacent to second side edges 68 of ribs 60.

Each seat pad sleeve 36, 38 is sized to receive one of the armrests 20, 24 therein. Each sleeve 36, 38 includes a first open end 81 coupled to back portion 34 of seat pad 30 and configured to provide an opening through which an armrest an be inserted and an armrest-receiving chamber 83 therein. The first open end 81 is positioned to lie adjacent to seat back 18.

Each sleeve 36, 38 also includes a second open end 80 positioned to lie adjacent to a distal end of its cantilevered armrest. Seat pad 30 further includes a front portion 82 closing the second open end of each sleeve 36, 38 to cover the front wall 54, 55 of each armrest 20, 24.

Each seat pad sleeve 36, 38 is arranged to cover one of the armrest openings 46, 47 to hide the rigidifying ribs 60 from view. When in use, side cover 70 is coupled to its companion armrest to close such an opening and is positioned to lie between the second side edges 68 of the ribs 60 and a surrounding sleeve 36 as shown, for example, in FIG. 5.

A juvenile vehicle seat 210 is shown in FIG. 6 to illustrate another way to cantilever an armrest 211 to a seat shell 212. A seat pad similar to pad 30 and including sleeve 213 can be installed on seat shell 212.

Although the invention has been described and defined in detail with reference to certain preferred embodiments, variations and modifications exist within the scope and spirit of the invention as described and defined in the following claims.

What is claimed is:

1. A juvenile vehicle seat comprising
a seat shell made of a plastics material and formed to include a seat bottom, a seat back extending upwardly relative to the seat bottom,
a left-arm armrest monolithically formed with and cantilevered to a left side of the seat back, and
a right-arm armrest monolithically formed with and cantilevered to a right side of the seat back
wherein each armrest includes an inner side wall along one side of the armrest and a boundary wall coupled to the inner side wall to define an interior region having an opening along another side of the armrest.

2. The seat of claim 1, further comprising a seat pad including a back portion engaging a portion of the seat back and a first armrest sleeve coupled to the back portion and formed to include a chamber receiving one of the left-arm and right-arm armrests therein.

3. The seat of claim 2, wherein the seat pad further includes a second armrest sleeve coupled to the back portion and formed to include a chamber receiving the other of the left-arm and right-arm armrest therein.

4. The seat of claim 3, wherein the back portion includes a left side edge arranged to lie along the left side of the seat back and a right side edge arranged to lie along the right side of the seat back, the first armrest sleeve is coupled to the left side edge of the back portion and surrounds the left-arm armrest, and the second armrest sleeve is coupled to the right side edge of the back portion and surrounds the right-arm armrest.

5. The seat of claim 1, wherein the armrests are positioned to lie on opposite sides of the seat bottom so that the inner side wall of the left-arm armrest faces toward the inner side wall of the right-arm armrest and the openings in each armrest face in opposite directions away from the seat bottom.

6. The seat of claim 5, further comprising a side cover coupled to each armrest to close the opening formed therein to establish an outer side wall thereof.

7. The seat of claim 1, wherein each armrest further includes a plurality of ribs positioned in the interior region and coupled to the boundary wall and to the interior wall to rigidify the armrest.

8. The seat of claim 7, further comprising a side cover coupled to each armrest to cover the ribs located in the interior region thereof.

9. The seat of claim 7, wherein each rib is defined by a wall having a bottom edge coupled to a lower portion of the boundary wall, a top edge coupled to an upper portion of the boundary wall arranged to lie in spaced-apart relation to the lower portion of the boundary wall, a first side edge coupled to the inner side wall, and a second side edge positioned to lie in the opening into the interior region formed therein.

10. The seat of claim 9, further comprising a side cover couple to each armrest and arranged to engage the second side edges of the ribs located in the interior region thereof.

11. The seat of claim 1, wherein the boundary wall is U-shaped and includes an elongated top wall extending away from the seat back to lie generally parallel to the seat bottom, an elongated bottom wall extending away from the seat back to lie under and in generally parallel spaced-apart relation to the top wall, and a front wall interconnecting the top and bottom walls and lying in generally perpendicular relation thereto.

12. The seat of claim 11, wherein the elongated top wall is coupled to a top edge of the inner side wall, the front wall is coupled to a front edge of the inner side wall, the elongated bottom wall is coupled to a bottom edge of the inner side wall, and each of the elongated top and bottom walls and the inner side wall is coupled to the seat back.

13. A juvenile vehicle seat comprising
a seat shell made of a plastics material and formed to include a seat bottom, a seat back extending upwardly relative to the seat bottom, and an armrest cantilevered to a side of the seat back, and
a seat pad including a back portion engaging a portion of the seat back and a sleeve coupled to the back portion and formed to include a chamber receiving the armrest therein
wherein the armrest includes an inner side wall along one side of the armrest, a top wall coupled to a top edge of the inner side wall, and a bottom wall coupled to a bottom edge of the inner side wall and arranged to lie in generally parallel spaced-apart relation to the top wall to define an interior region having an opening along another side of the armrest therebetween, and the sleeve covers the top and bottom walls, the inner side wall, and the opening formed in the armrest.

14. The seat of claim 13, wherein the armrest further includes ribs positioned in the interior region and coupled to the inner side wall and the top and bottom walls and the sleeve covers side edges of the ribs positioned to lie in the opening formed in the armrest.

15. The seat of claim 14, further comprising a side cover coupled to the armrest to close the opening and positioned to lie between the side edges of the ribs and the sleeve.

16. The seat of claim 13, wherein the sleeve has a first open end positioned to lie adjacent to the seat back and a second open end positioned to lie adjacent to a distal end of the cantilevered armrest, the armrest further includes a front wall interconnecting the top and bottom walls at the distal end, and the seat pad further includes a front portion closing the second open end of the sleeve and covering the front wall of the armrest.

17. The seat of claim 13, wherein the armrest is monolithically formed with a side of the seat back.

* * * * *